(12) United States Patent
Lee et al.

(10) Patent No.: US 12,525,313 B2
(45) Date of Patent: Jan. 13, 2026

(54) METHOD FOR TESTING AND REPAIRING MEMORY DEVICE

(71) Applicant: Taiwan Semiconductor Manufacturing Company, Ltd., Hsinchu (TW)

(72) Inventors: Po-Hao Lee, Hsinchu (TW); Chia-Fu Lee, Hsinchu (TW); Yu-Der Chih, Hsin-Chu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 236 days.

(21) Appl. No.: 18/314,825

(22) Filed: May 10, 2023

(65) Prior Publication Data

US 2024/0379183 A1    Nov. 14, 2024

(51) Int. Cl.
*G11C 29/02* (2006.01)
*G11C 29/44* (2006.01)
*G11C 11/16* (2006.01)

(52) U.S. Cl.
CPC ...... *G11C 29/4401* (2013.01); *G11C 11/1673* (2013.01)

(58) Field of Classification Search
USPC ........................................................ 365/200
See application file for complete search history.

(56) References Cited

U.S. PATENT DOCUMENTS

| | | | | |
|---|---|---|---|---|
| 6,269,040 B1 * | 7/2001 | Reohr | ...................... | G11C 7/18 365/201 |
| 2007/0097730 A1 * | 5/2007 | Chen | .................... | G11C 11/1653 365/158 |
| 2007/0195621 A1 | 8/2007 | Lamorey et al. | | |
| 2009/0201717 A1 * | 8/2009 | Maeda | .................... | G11C 11/16 365/158 |
| 2014/0056052 A1 | 2/2014 | Lee | | |
| 2019/0279709 A1 * | 9/2019 | Lee | ....................... | G11C 29/028 |

(Continued)

FOREIGN PATENT DOCUMENTS

| | | |
|---|---|---|
| CN | 115841840 | 3/2023 |
| CN | 110246531 | 4/2023 |
| TW | I739471 | 9/2021 |

OTHER PUBLICATIONS

"Office Action of Taiwan Counterpart Application", issued on May 10, 2024, p. 1-p. 6.

*Primary Examiner* — Amir Zarabian
(74) *Attorney, Agent, or Firm* — JCIPRNET

(57) ABSTRACT

A method for testing and repairing a memory device is provided. The memory device includes a memory array having data cells and reference cells arranged along cell rows and cell columns. The data cells are configured to store data, and the reference cells are configured to generate a reference current for reading the data stored in the data cells. The method includes: performing a row repair, to test the reference cells in each cell row, and to replace the cell row containing at least one defective reference cell by a redundant cell row comprising additional data cells and additional reference cells; and performing a local reference current trimming, to modify a ratio of an amount of the reference cells programmed with a low resistance state over an amount of the reference cells programmed with a high resistance state for at least one of the cell rows.

20 Claims, 10 Drawing Sheets

(56) References Cited

U.S. PATENT DOCUMENTS

| | | | | |
|---|---|---|---|---|
| 2022/0343960 A1* | 10/2022 | Guo | ................... | G11C 29/025 |
| 2022/0399049 A1* | 12/2022 | Tezuka | ................ | G11C 13/004 |
| 2023/0178172 A1* | 6/2023 | Yun | ..................... | G11C 29/846 |
| | | | | 714/719 |

* cited by examiner

METHOD FOR TESTING AND REPAIRING MEMORY DEVICE

BACKGROUND

For a resistive-type memory, read operation can be implemented by comparing a data current from a selected one of data cells and a reference current provided by one or more reference cells. The comparison result indicates whether the selected data cell is programmed with a high resistance state (may represent a logic data "0") or a low resistance state (may represent a logic data "1"). Inevitably, there may be defective ones among the data cells and the reference cells. Further, read margin for data cells at different rows and columns may vary. Therefore, reliable testing and repairing processes are required for ensuring accuracy of the read operation.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
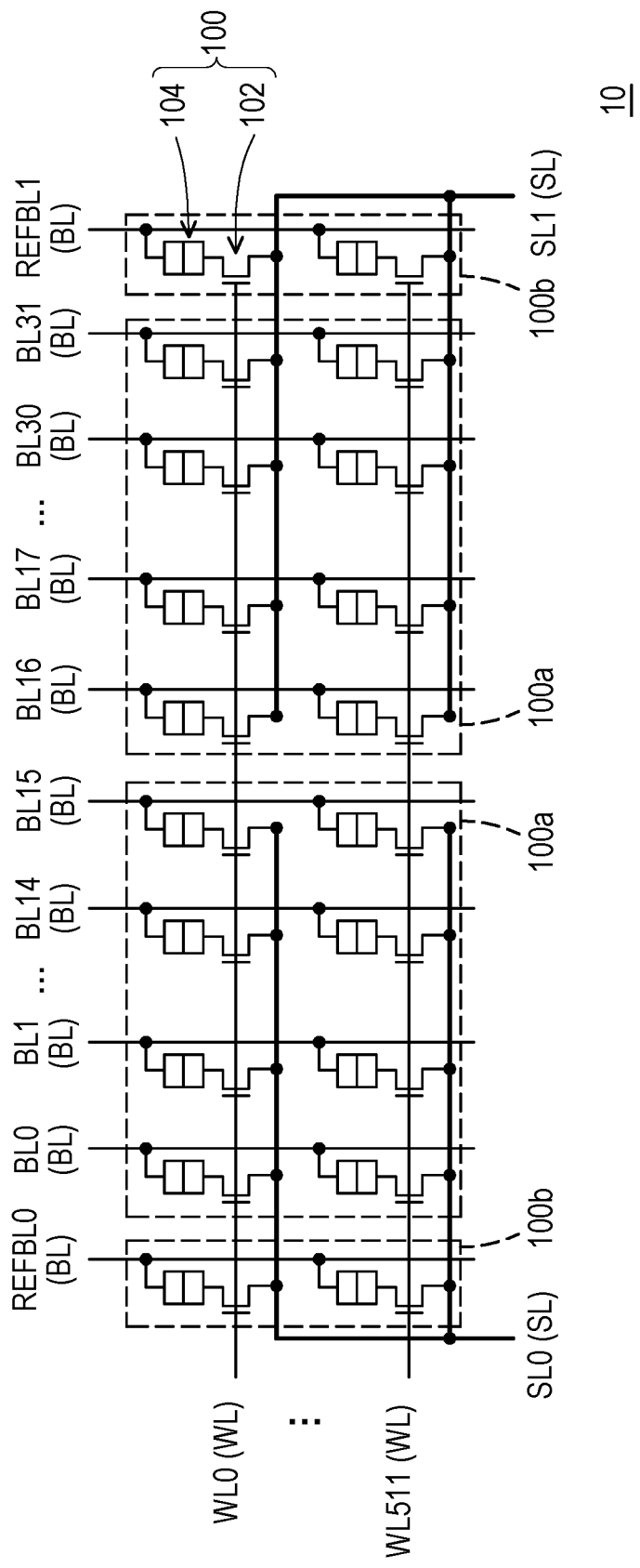
FIG. 1A illustrates a circuit diagram of a portion of a memory array, according to some embodiments of the present disclosure.

The following disclosure provides many different embodiments or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1A illustrates a circuit diagram of a portion of a memory array 10, according to some embodiments of the present disclosure.

Referring to FIG. 1A, the memory array 10 includes columns and rows of memory cells 100. Each memory cell 100 includes an access transistor 102 and a resistive storage device 104 connected to the access transistor 102. In some embodiments, the access transistor 102 is a field effect transistor (FET), and the resistive storage device 104 is connected to a source/drain terminal of the access transistor 102. Further, in some embodiments, the resistive storage device 104 as a two-terminal device includes a magnetic tunnel junction (MTJ), in which a tunneling barrier is sandwiched between two magnetic layers. When magnetizations of the two magnetic layers are in parallel orientation, it is more likely that electrons can tunnel through the tunneling barrier, thus the MTJ is in a low resistance state. On the other hand, if magnetizations of the two magnetic layers are in anti-parallel orientation, the MTJ is in a high resistance state. In this way, logic data "1", "0" can be stored as the low resistance state and the high resistance state (interchangeably). As the magnetizations of the magnetic layers remain even after power supply is removed, the resistive storage device 104 can be referred to as a nonvolatile storage device.

Bit lines BL respectively connect a column of the memory cells 100, and word lines WL respectively connect a row of the memory cells 100. In this way, each memory cell 100 is defined at an intersection of one of the bit lines BL and one of the word lines WL, and can be independently accessed. In each memory cell 100, a terminal of the resistive storage device 104 is connected to a terminal of the access transistor 102 (e.g., a source/drain terminal of the access transistor 102), while the other terminal of the resistive storage device 104 is connected to one of the bit lines BL. In those embodiments where the access transistors 102 are FETs, each access transistor 102 is connected to one of the word lines WL via a gate terminal, and can be switched by the one of the word lines WL.

Further, the access transistors 102 of the memory cells 100 are respectively connected to a source line SL. In those embodiments where the access transistors 102 are FETs, each access transistor 102 is connected to one of the source lines SL via a source/drain terminal, and connected to the resistive storage device 104 in the same memory cell 100 by the other source/drain terminal. In this way, a voltage bias across each resistive storage device 104 can be determined by the connected bit line BL and source line SL when the coupled access transistor 102 is turned on, and the resistive storage device 104 in a selected memory cell 100 can be subjected to a write operation or a read operation. In addition, the resistive storage device 104 in each memory cell 100 may be written by utilizing spin-transfer torque (STT), and the memory array 10 may be referred to as a STT magnetic random access memory (STT MRAM).

The depicted portion of the memory array 10 is connected to a sense amplifier (not shown) by the connected source lines SL (e.g., source lines SL0, SL1), and configured to be read out by using the sense amplifier. As will be further described with reference to FIG. 1B, the memory array 10 may include a plurality of sub-arrays each shown in FIG. 1A, and is connected to a plurality of sense amplifiers through more of the source lines SL. Each sub-array of the memory cells 100 are connected to the same sense amplifier, and can be divided into data cells 100a and reference cells 100b. The data cells 100a are functioned for data storage, while the reference cells 100b are configured to provide a reference current for reading the data stored in the data cells 100a. As an example shown in FIG. 1A, the data cells 100a are defined at intersections of a series of the word lines WL (e.g., from a word line WL0 to a word line WL511) and a series of the bit lines BL (e.g. bit lines BL0, BL1, . . . , BL14, BL15, BL16, BL17, . . . , BL30, BL31), and the reference cells 100b are arranged in two columns connected to the series of the word lines WL and two of the bit lines BL running at opposite sides of the series of the bit lines BL connected to the data cells 100a. For illustration purpose, the bit lines BL connected to the reference cells 100b are referred to as reference bit lines (e.g., reference bit lines REFBL0, REFBL1). Further, one of the source lines SL (e.g., the source line SL0) is connected to multiple columns of the data cells 100a (e.g., the data cells 100a defined at intersections of the word lines WL0 to WL511 and the bit lines BL0 to BL15) and a column of the reference cells 100b (e.g., the reference cells 100b defined at intersections of the word lines WL0 to WL511 and the reference bit line REFBL0). In addition, another one of the source lines SL (e.g., the source line SL1) is connected to other columns of the data cells 100a (e.g., the data cells 100a defined at intersections of the word lines WL0 to WL511 and the bit lines BL16 to BL31) and the other column of the reference cells 100b (the reference cells 100b defined at intersections of the word lines WL0 to WL511 and the reference bit line REFBL1). When one of the data cells 100a connected to one of the source lines SL (e.g., the source line SL0) is selected for reading, one of the reference cells 100b connected to the other source line SL (e.g., the source line SL1) can be selected for providing a reference current, and the selected data cell 100a and reference cell 100b can be connected to the corresponding sense amplifier through different ones of the source lines SL. In this way, interference between the selected data cell 100a and the reference cell 100b can be avoided.

Figure 1B:
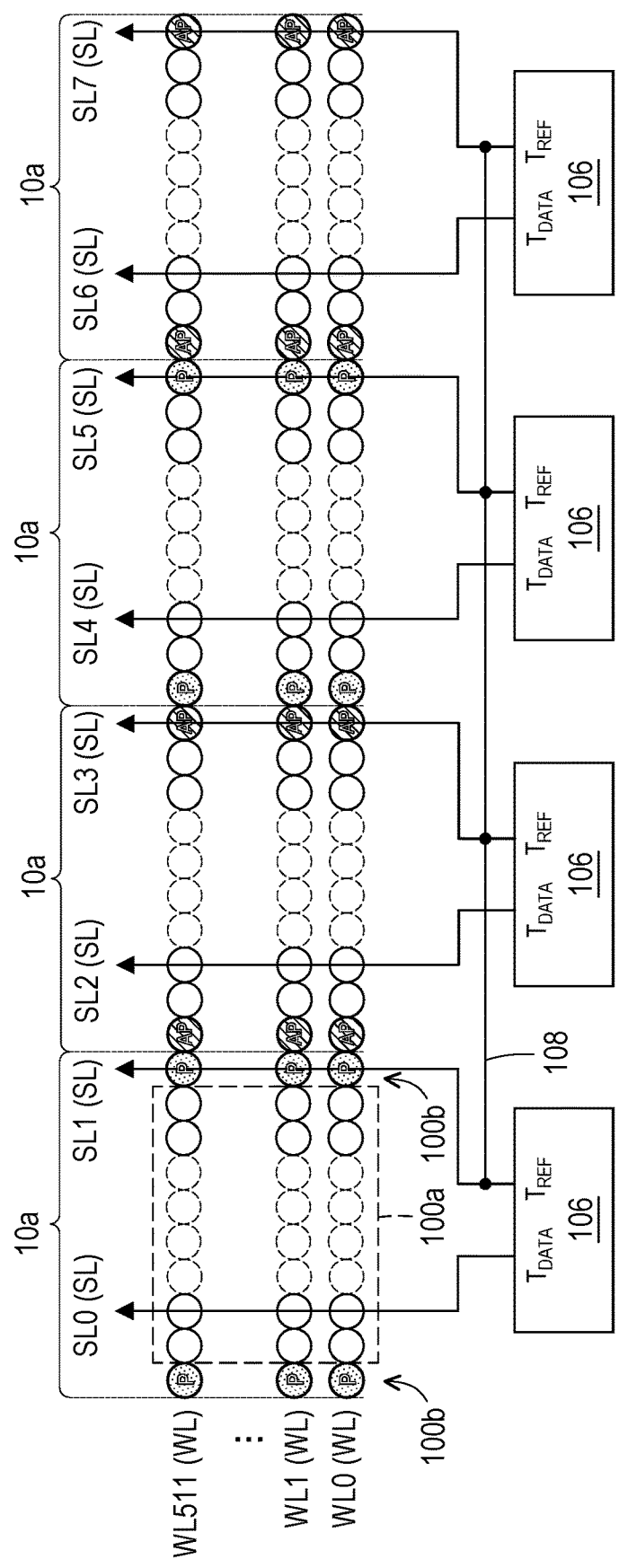
FIG. 1B illustrates a read scheme of the memory array, according to some embodiments of the present disclosure.

FIG. 1B illustrates a read scheme of the memory array 10, according to some embodiments of the present disclosure.

Referring to FIG. 1B, the memory array 10 includes sub-arrays 10a respectively connected to a sense amplifier 106 by at least two of the source lines SL (e.g., source lines SL0, SL1, SL2, SL3, SL4, SL5, SL6, SL7). Each sub-array 10a includes columns of the data cells 100a and at least two columns of the reference cells 100b (e.g., two columns of the reference cells 100b). The word lines WL (e.g., word lines WL0, WL1 . . . , WL511, which are only shown by labels in FIG. 1B) extend through the sub-arrays 10a, and respectively connect the data cells 100a and the reference cells 100b arrange along the same row. On the other hand, the bit lines BL (not shown in FIG. 1B) extend through each of the sub-arrays 10a, and respectively connect a column of the data cells 100a or a column of the reference cells 100b in one of the sub-arrays 10a. Further, as described with reference to FIG. 1A, the data cells 100a and the reference cells 100b in each sub-array 10a are grouped, such that a selected one of the data cells 100a in a group and one of the reference cells 100b in another group can be connected to the corresponding sense amplifier 106 by different ones of the source lines SL during a read operation.

As shown in FIG. 1B, the reference cells 100b in some of the sub-arrays 10a are programmed with a parallel orientation P indicating a low resistance state, and the reference cells 100b in others of the sub-arrays 10a are programmed with an anti-parallel orientation AP indicating a high resistance state. During a read operation, some of the reference cells 100b programmed with the parallel orientation P and some of the reference cells 100b programmed with the anti-parallel orientation AP are connected in parallel between one of the sense amplifiers 106 and a common terminal, to provide a reference current (corresponding to an intermediate resistance state lower than the high resistance state but higher than the low resistance state) to a reference input terminal $T_{REF}$ of the sense amplifier 106. By using the sense amplifier 106 to compare the reference current with a data current passing through a selected one of the data cells 100a and fed to a data input terminal $T_{DATA}$ of the sense amplifier 106, either the selected data cell 100a was programmed with the high resistance state or the low resistance state can be identified. Accordingly, the data stored in the selected data cell 100a can be read out. As the reference current is contributed by multiple ones of the reference cells 100b programmed with the parallel orientation P (corresponding to the low resistance state) and multiple ones of the reference cells 100b programmed with the anti-parallel orientation AP (corresponding to the high resistance state), variation of the reference current resulted from individual reference cells 100b can be minimized. Further, according to the above-described circuit configuration and read scheme, the reference cells 100b from multiple ones of the sub-arrays 10 are connected, and participate in generating the reference current to one of the sense amplifiers 106. Therefore, each reference cell 100b is not only connected to the reference input terminal $T_{REF}$ of a corresponding one of the sense amplifiers 106, but also connected to the reference input terminals $T_{REF}$ of other sense amplifiers 106. In this way, the reference input terminals $T_{REF}$ of the sense amplifiers 106 may be connected together. In some embodiments, an interconnection line 108 may be used for connecting the reference input terminals $T_{REF}$ of the sense amplifiers 106.

During an exemplary read operation, one of the data cells 100a in a sub-array 10a is selected and connected to the data input terminal $T_{DATA}$ of the corresponding sense amplifier 106 via the source line SL0. Meanwhile, the reference cell 100b in the same sub-array 10a and arranged in the same row as the selected data cell 100a is connected to the reference input terminal $T_{REF}$ of the same sense amplifier 106 via the source line SL1. Further, some of the reference cells 100b from other sub-arrays 10a and arranged in the same row as the selected data cell 100a are also connected to the reference input terminal $T_{REF}$ of the sense amplifier 106 via the source lines SL3, SL5, SL7. The reference cells 100b connected to the source lines SL1, SL5 may be programmed with the parallel orientation P, whereas the reference cells 100b connected to the source lines SL3, SL7 may be programmed with the anti-parallel orientation AP. By connecting these reference cells 100b in parallel, an equivalent resistance lower than the high resistance state corresponding to the anti-parallel orientation AP but higher than the low resistance state corresponding to the parallel orientation P can be resulted, and a reference current corresponding to the intermediate resistance state can be provided to the sense amplifier 106. As described, the sense amplifier 106 can compare the data current fed to the data input terminal $T_{DATA}$ from the selected data cell 100a with the reference current provided by the reference cells 100b, and can read out the data stored in the selected data cell 100a.

It can be appreciated that the example is provided for illustration purpose. In general, more of the reference cells 100b may be used for generating the reference current. For instance, 36 reference cells 100b from 36 sub-arrays 10a are connected in parallel during a read operation, for producing the reference current. Among the 36 reference cells 100b, a ratio of an amount of the reference cells 100b programmed with the parallel orientation P with respect to an amount of the reference cells 100b programmed with the anti-parallel orientation AP may be close to or equal to 1.

The read operation as described above may be accurate in ideal situation. However, in real situation, there may be defective ones among the data cells 100a and the reference cells 100b, and read margin defined as difference between the reference current and data current may vary from row to row and/or from sense amplifier 106 to sense amplifier 106. A method for testing and repairing the memory array 10 is required to ensure accuracy of the read operation.

Figure 2:
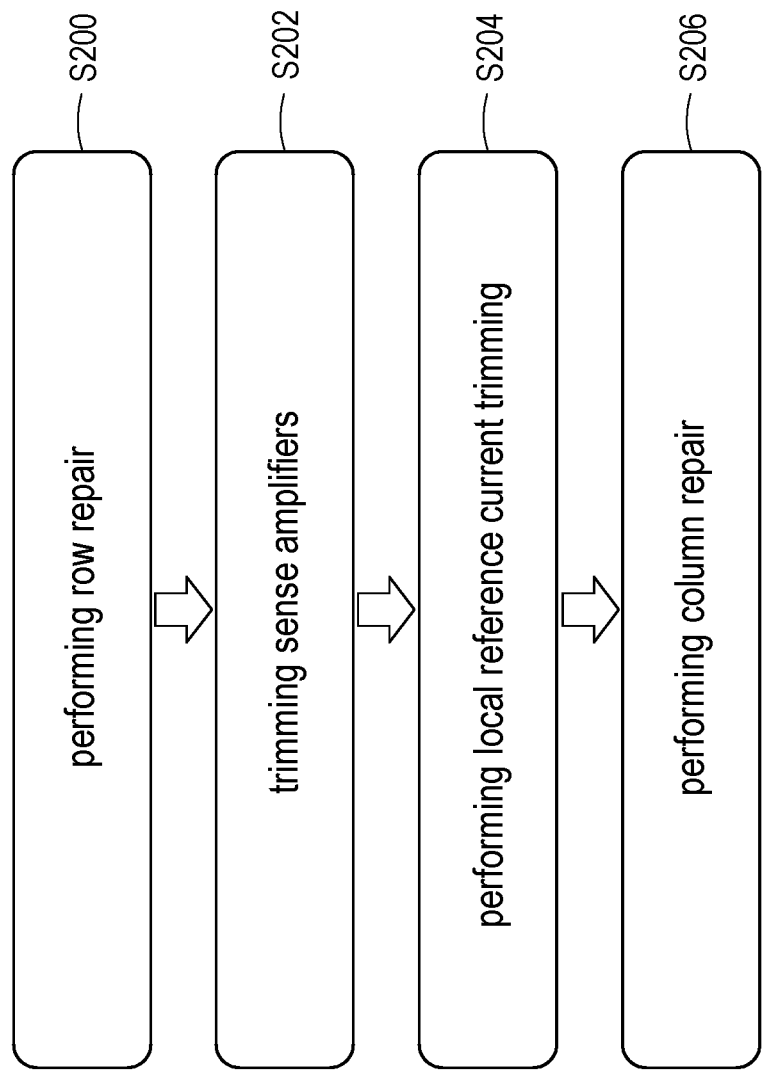
FIG. 2 is a flow diagram illustrating a process for testing and repairing the memory array, according to some embodiments of the present disclosure.

FIG. 2 is a flow diagram illustrating a process for testing and repairing the memory array 10, according to some embodiments of the present disclosure.

Referring to FIG. 2, at a step S200, row repair is performed. Specifically, by performing the row repair, defective one(s) among the reference cells 100b is/are identified, and defective row(s) including the defective reference cell(s) 100b is/are replaced. In order to identify the defective one(s) of the reference cells 100b, read operations are performed on the reference cells 100b in each row. In each of such read operations, one of the reference cells 100b is connected to the data input terminal $T_{DATA}$ of the corresponding sense amplifier 106 to provide a data current to the data input terminal $T_{DATA}$ of the sense amplifier 106, and all of other reference cells 100b arranged in the same row as the selected reference cell 100b are connected in parallel to provide a reference current to the reference input terminal $T_{REF}$ of the sense amplifier 106. By using the sense amplifier 106 to compare the data current and the reference current, it can be verified if the selected reference cell 100b is correctly programmed with the pre-determined resistance state. If the selected reference cell 100b is correctly programmed, then another read operation is performed on next one of the reference cells 100b. If the resistance state of the selected reference cell 100b does not match the pre-determined resistance state and is determined as defective, the selected reference cell 100b as well as all of other reference cells 100b and the data cells 100a arrange in the same row as the selected reference cell 100b are replaced by a redundant row of data cells 100a and reference cells 100b, as will be further described.

Figure 3:
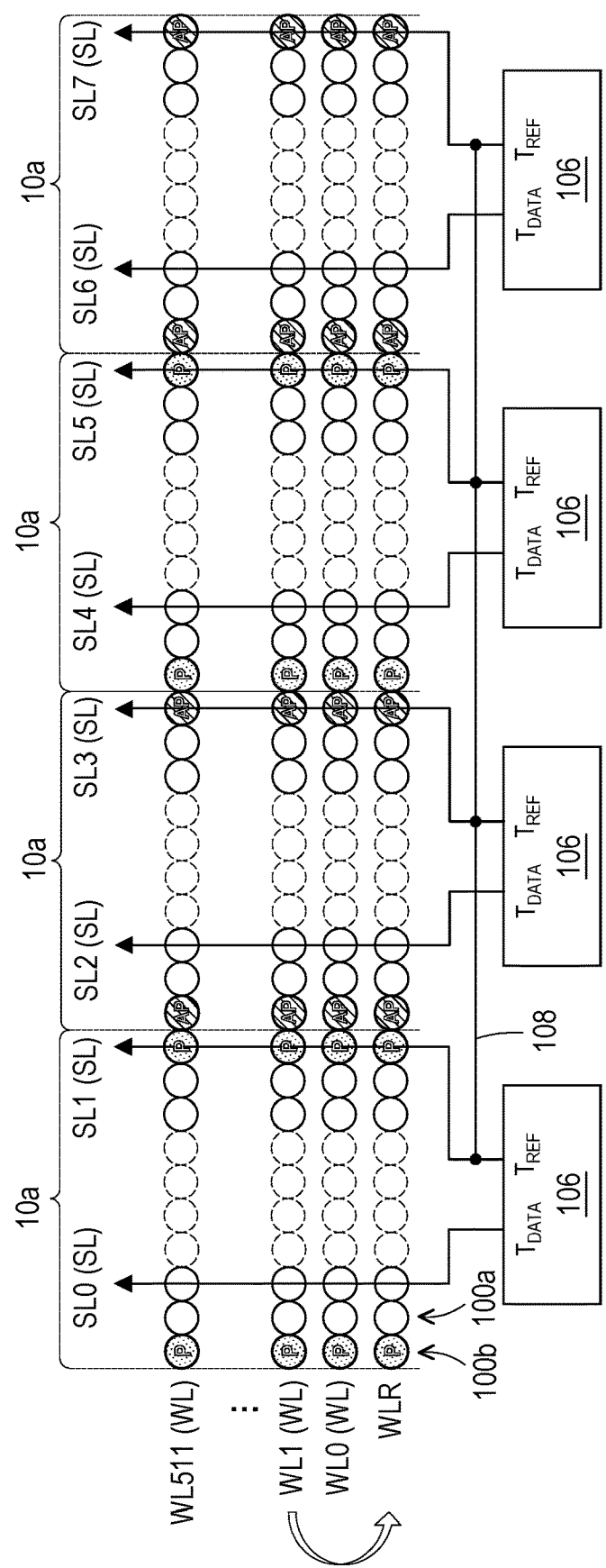
FIG. 3 illustrates a row repair scheme for the memory array, according to some embodiments of the present disclosure.

FIG. 3 illustrates a row repair scheme for the memory array 10, according to some embodiments of the present disclosure.

Although not shown in FIG. 1A and FIG. 1B, the memory array 10 includes at least one redundant row of data cells 100a and reference cells 100b. As shown in FIG. 3, for instance, the memory array 10 may include one redundant row arranged aside normal cell rows. The data cells 100a and the reference cells 100b in the normal cell rows are connected along the word lines WL (e.g., the word lines WL0, WL1, . . . , WL511). Similarly, the data cells 100a and the reference cells 100b of the redundant row are connected along a repair word line WLR (which is only shown by label). Although not shown, the bit lines BL also extend through the redundant row, and the source lines SL also connect the data cells 100a and the reference cells 100b in the redundant row to the sense amplifiers 106 by groups. Further, the redundant row is identical with the normal cell rows in terms of arrangement of the data cells 100a and the reference cells 100b. For instance, in each of the redundant row and the normal cell rows, a group of the data cells 100a are arranged between two reference cells 100b within each sub-array 10a. According to some embodiments, the reference cells 100b in the redundant row may be pre-programmed as identical with the reference cells 100b in the normal cell rows (except for the defective one(s)) of the same sub-array 10a. As the normal cell row including at least one defective reference cell 100b is replaced by the redundant row, the redundant row is accessed when the normal cell row being replaced is supposed to be accessed. For instance, if the normal cell row connected by the word line WL1 has at least one defective reference cell(s) 100b, the redundant row connected by the repair word line WLR may be used for replacing the normal cell row connected by the word line WL1. During the following process for testing and repairing as well as in normal read and write operations, the data cells 100a in the redundant row will take the place of the data cells 100a in the normal cell row connected by the word line WL1, and the reference cells 100b in the redundant row will take the place of the reference cells 100b in the normal cell row connected by the word line WL1. That is, instructions for accessing the normal cell row connected by the word line WL1 will be redirected to the redundant row.

In other examples, the memory array 10 may include multiple redundant rows, in case more than one normal cell row are found with defective reference cells 100b. Those skilled in the art may adjust an amount of the redundant row(s) according to manufacturing yield of the memory array 10, the present disclosure is not limited thereto.

According to some embodiments, word line address(es) of the defective reference cell(s) 100b as well as the corresponding address(es) of the repair word line(s) WLR are stored in a row redundancy look up table (RRLUT). As an example, the RRLUT may be implemented by a latch-based memory circuit, such as a static random access memory (SRAM) circuit. When a word line address is provided for accessing one or more of the data cells 100a on the designated word line WL, a logic circuit (not shown) may be used to check if such word line address matches any of the address(es) of the defective reference cell(s) 100b stored in the RRLUT. If not, this word line address will be passed to a word line decoder (not shown), for asserting the designated word line WL in the memory array 10. If this word line address matches an address of a defective reference cell 100b stored in the RRLUT, then the logic circuit outputs the address of the repair word line WLR corresponding to this address of the defective reference cell 100b, and the word line decoder instead asserts the repair word line WLR. That is, the normal cell row including at least one defective reference cell(s) 100b is re-addressed to the corresponding redundant row.

Referring back to FIG. 2, at a following step S202, the sense amplifiers 106 are subjected to trimming. As a result of the trimming, read margin can be optimized. Specifically, the data currents of the data cells 100a programmed with the low resistance state (corresponding to the parallel orientation P) may distribute within a certain range. Similarly, the data currents of the data cells 100a programmed with the high resistance state (corresponding to the anti-parallel orientation AP) and the reference currents generated by the reference cells 100b may vary as well. A spacing (in terms of current) between a distribution of the data currents of the data cells 100a programmed with the low resistance state and a distribution of the reference current defines a read margin for the low resistance state. In addition, a spacing (also in terms of current) between a distribution of the data currents of the data cells 100a programmed with the high resistance state and the distribution of the reference current define a read margin for the high resistance state. In certain cases, the spacings between the reference current distribution and the data current distributions may not be identical with each other, and the read margin for one of the low resistance state and the high resistance state may be too narrow. By trimming the sense amplifiers 106, the data current distributions and/or the reference current distribution can be shifted, such that the spacings between the reference current distribution and the data current distributions can be tuned, and closer read margins for the low resistance state and the high resistance state can be obtained. In other cases, the reference current distribution may even overlap one or both of the data current distributions. By trimming the sense amplifiers 106, the overlap can be reduced or even eliminated, and fail counts of read operations can be reduced.

Figure 4A:
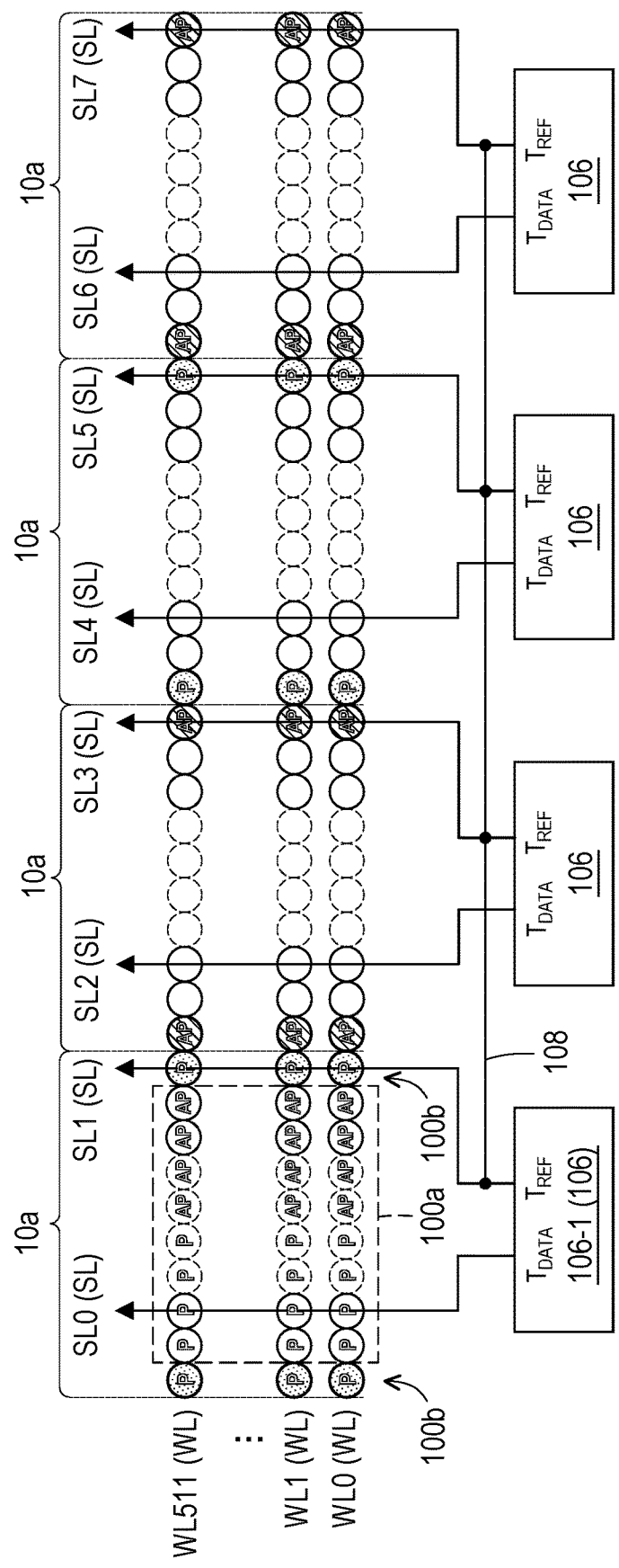
FIG. 4A illustrate a trimming operation for a sense amplifier, according to some embodiments of the present disclosure.
Figure 4B:
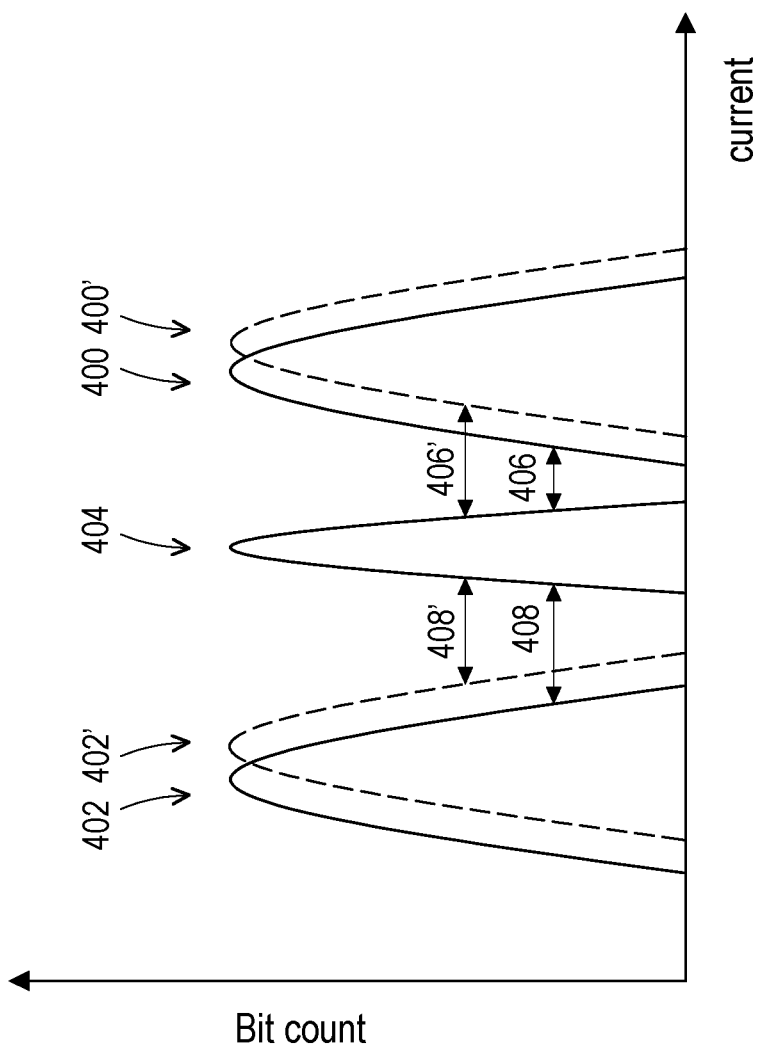
FIG. 4B shows a possible shift of the current distributions during the trimming operation shown in FIG. 4A.

FIG. 4A illustrate a trimming operation for one of the sense amplifiers 106, according to some embodiments of the present disclosure. FIG. 4B shows a possible shift of the current distributions during the trimming operation shown in FIG. 4A.

Referring to FIG. 4A, when one of the sense amplifiers 106 (also referred to as "sense amplifier 106-1") is subjected to trimming, a first half of the data cells 100a connected to the sense amplifier 106-1 are programmed with the low resistance state (corresponding to the parallel orientation P), and a second half of the data cells 100a connected to the sense amplifier 106-1 are programmed with the high resistance state (corresponding to the anti-parallel orientation AP). Thereafter, the sense amplifier 106 is operated to read each of the connected data cells 100a, as described with reference to FIG. 1B. Also, the sense amplifier 106-1 may be operated to read each of the connected reference cells 100b, and the read operations for sensing the reference cells 100b are each similar to the read operation used for identifying defective reference cell(s) 100b, as described with reference to FIG. 3.

The resulted current distributions are shown in FIG. 4B. A horizontal axis of the diagram in FIG. 4B shows magnitude of current, whereas a vertical axis of the diagram in FIG. 4B shows bit (cell) count. As shown in FIG. 4B, the data current distribution 400 of the data cells 100a programmed with the low resistance state (corresponding to the parallel orientation P) covers the highest current range; the data current distribution 402 of the data cells 100b programmed with the high resistance state (corresponding to the anti-parallel orientation AP) covers the lowest current range; and the reference current distribution 404 of the reference current is located between the data current distributions 400, 402. As an example, a spacing 406 between the data current distribution 400 and the reference current distribution 404 is much shorter than a spacing 408 between the data current distribution 402 and the reference current distribution 404.

In this case, the read margin for the low resistance state may be too narrow. In order to balance out the spacings 406, 408, the data current distributions 400, 402 could be both shifted toward higher magnitude of current, and such shift can be realized by increasing current level at the data input terminal $T_{DATA}$ of the sense amplifier 106-1. As another alternative or in combination with the foregoing alternative, the spacings 406, 408 can be balanced by shifting the reference current distribution 404 toward lower magnitude of current, and such shift can be realized by decreasing current level at the reference input terminal $T_{REF}$ of the sense amplifier 106-1.

As another example, the reference current distribution 404 may even overlap one or both of the data current distributions 400, 402. In order to improve read accuracy, the overlap has to be reduced, and the reduction of current distribution overlap can be implemented by shifting the data current distributions 400, 402 and/or the reference current distribution 404 as well.

Figure 4C:
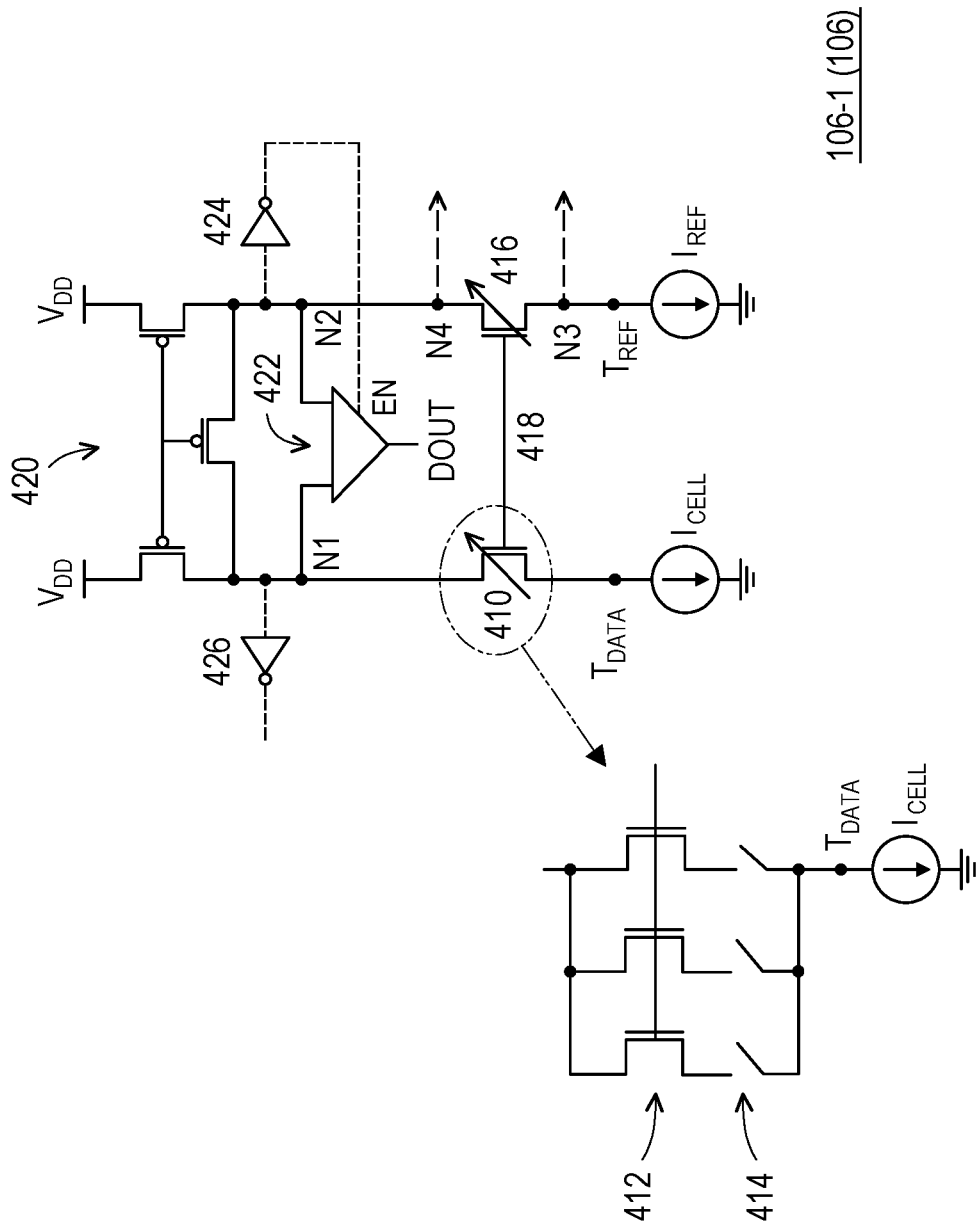
FIG. 4C illustrates detailed circuit of the sense amplifier, according to some embodiments of the present disclosure.

FIG. 4C illustrates detailed circuit of each sense amplifier 106, according to some embodiments of the present disclosure.

Referring to FIG. 4C, like other sense amplifiers 106, the sense amplifier 106-1 includes a data current trimming device 410 coupled to the data input terminal $T_{DATA}$. During a read operation for sensing a selected one of the data cells 100a, a data current $I_{CELL}$ is provided to the data input terminal $T_{DATA}$ from the selected data cell 100a, and can be amplified or cut by the data current trimming device 410. In some embodiments, the data current trimming device 410 includes a plurality of transistors 412, such as N-type field effect transistors (NFETs). The transistors 412 are switchably connected in parallel between the data input terminal $T_{DATA}$ and a node N1 in the sense amplifier 106-1. By increasing an amount of the transistors 412 connected in parallel, the data current $I_{CELL}$ can be amplified to a higher level. As amplifying the data current $I_{CELL}$ in each of the read operations for sensing the data cells 100a, the data current distributions 400, 402 described with reference to FIG. 4B could be both shifted toward higher magnitude of current. On the other hand, by reducing the amount of the transistors 412 connected in parallel, the data current $I_{CELL}$ can be lowered. As reducing the data current $I_{CELL}$ in each of the read operations for sensing the data cells 100a, the data current distributions 400, 402 described with reference to FIG. 4B could be both shifted toward lower magnitude of current.

Switches 414 may be used for controlling the amount of the transistors 412 connected in parallel. To be more specific, the transistors 412 may share a common source/drain terminal that may be connected to the node N1, and the other source/drain terminals of the transistors 412 may be connected to the data input terminal $T_{DATA}$ through the switches 414, respectively. Further, gate terminals of the transistors 412 are connected. In this way, if all of the switches 414 are closed (shorted), all of the transistors 412 are connected in parallel, and the node N1 can be coupled to the most amplified data current $I_{CELL}$. As more of the switches 414 are opened, fewer of the transistors 412 are connected in parallel, and the node N1 can be coupled to less amplified or even lowered data current $I_{CELL}$.

Likewise, a reference current trimming device 416 may be coupled between the reference input terminal $T_{REF}$ and a node N2 of the sense amplifier 106-1. During each of the read operations for sensing the data cells 100a, a reference current $I_{REF}$ is provided to the reference input terminal $T_{REF}$ by a group of the reference cells 100b, and can be amplified or cut by the reference current trimming device 416. Equivalently, the reference current distribution 404 can be shifted. As similar to the data current trimming device 410, the reference current trimming device 416 may include transistors (not shown, such as NEFTs) switchably connected in parallel, and switches (also not shown) may be used for adjusting an amount of the transistors that are connected in parallel. In some embodiments, the gate terminals of the transistors 412 of the data current trimming device 410 are connected with gate terminals of the transistors of the reference current trimming device 416 via a common gate line 418, and the data current trimming device 410 and the reference current trimming device 416 can be activated simultaneously.

Moreover, in some embodiments, the reference input terminal $T_{REF}$ of the sense amplifier 106-1 can be connected to the reference input terminals $T_{REF}$ of other sense amplifiers 106 via a node N3, which is at input sides of the reference current trimming devices 416 of these connected sense amplifiers 106. In these embodiments, amplification or reduction of the reference current $I_{REF}$ can be individually performed, and can be different among the sense amplifiers 106. In alternative embodiments, the reference input terminal $T_{REF}$ of the sense amplifier 106-1 can be connected to the reference input terminals $T_{REF}$ of other sense amplifiers 106 via a node N4, which is at output sides of the reference current trimming devices 416 of these connected sense amplifiers 106. In these alternative embodiments, amplification or reduction of the reference current $I_{REF}$ for the connected sense amplifiers 106 can be linked, and may be substantially identical among the connected sense amplifiers 106.

In each of the read operations for sensing the data cells 100a, each sense amplifier 106 (e.g., the sense amplifier 106-1) may be operated that a pre-charging circuit 420 connecting to the nodes N1, N2 may be initially enabled to charge the nodes N1, N2 to a power supply voltage $V_{DD}$. As the nodes N1, N2 are decoupled from the power supply source, the data current trimming device 410 and the reference current trimming device 416 may be activated by asserting the common gate line 418, and the connected transistors in the data current trimming device 410 and the reference current trimming device 416 are turned on. Accordingly, the data current $I_{CELL}$, and the reference current $I_{REF}$ can be adjusted and coupled to the nodes N1, N2. As described, the data current $I_{CELL}$ either corresponds to the low resistance state or the high resistance state, and the reference current $I_{REF}$ corresponds to an intermediate resistance state higher than the low resistance state but lower than the high resistance state. Consequently, one of the nodes N1, N2 is discharged more than the other. A latch-based circuit 422 connecting to the nodes N1, N2 is operated to compare resulted voltage potentials at the nodes N1, N2, so as to determine whether the data current $I_{CELL}$ corresponds to the low resistance state or the high resistance state. A comparison result may be provided at an output terminal DOUT of the latch-based circuit 422. In some embodiments, an inverter 424 connected to the node N2 is configured to provide an enablement signal EN to the latch-based circuit 422 after the data current $I_{CELL}$, and the reference current $I_{REF}$ are coupled to the nodes N1, N2. According to some embodiments, an additional inverter 426 is coupled to the node N1, in order to balance loading at the nodes N1, N2.

Referring back to FIG. 2, at a subsequent step S204, local reference current trimming is performed, to further improve read margin for each row. As described with reference to FIG. 1B, when one of the data cells 100a connected to one of the word lines WL is selected for reading, a group of the reference cells 100b connected along the same word line WL as the selected data cell 100a are connected in parallel to provide a reference current. Some of the reference cells 100b in the group are programmed with the low resistance state (corresponding to the parallel orientation P), and others of the reference cells 100b in the group are programmed with the high resistance state (corresponding to the anti-parallel orientation AP). A ratio of an amount of the reference cells 100b in the group and programmed with the low resistance state over an amount of the reference cells 100b in the group and programmed with the high resistance state approximates or equal to 1. For instance, for reading one of the data cells 100a connected to the word line WL1, 36 reference cells 100b arranged along the word line WL1 are connected in parallel to provide the reference current. Among the 36 reference cells 100b, 18 reference cells 100b are programmed with the low resistance state, and the other 18 reference cells 100b are programmed with the high resistance state.

However, conditions for the memory cells 100 connected along a first one of the word lines WL might be different from the memory cells 100 connected along a second one of the word lines WL, and the reference current suitable for reading one of the data cells 100a connected along the first word line WL might be different from the reference current suitable for reading one of the data cells 100a connected along the second word line WL. As an example (but not limited thereto), the above-described row difference may lie in that a signal path from the reference cells 100b connected along the first word line WL to the corresponding sense amplifier 106 may be longer or shorter than a signal path from the reference cells 100b connected along the second word line WL to the corresponding sense amplifier 106. In order to optimize read margin for the data cells 100a at each row, the reference current for each row should be fine-tuned.

An approach to adjust the reference current generated by a group of the reference cells 100b connected along one of the word lines WL includes changing a ratio of an amount of the reference cells 100b in the group and programmed with the low resistance state over an amount of the reference cells 100b in the group and programmed with the high resistance state. By increasing such ratio (i.e., increasing the amount of the reference cells 100b in the group and programmed with the low resistance state), the reference current generated by the group of the reference cells 100b can be raised. On the other hand, by lowering the ratio (i.e., reducing the amount of the reference cells 100b in the group and programmed with the low resistance state), the reference current generated by the group of the reference cells 100b can be lowered. According to some embodiments, a built-in self-test (BIST) circuitry (not shown) coupled to the memory array 10 is operated to determine an optimum value of such ratio (the ratio of an amount of the reference cells 100b programmed with the low resistance state over an amount of the reference cells 100b programmed with the high resistance state) for each row.

In some embodiments, altering the ratio (the ratio of the amount of the reference cells 100b programmed with the low resistance over the amount of the reference cells 100b programmed with the high resistance state) for one row includes changing the pattern of the resistance states of the reference cells 100b arranged along this row.

Figure 5:
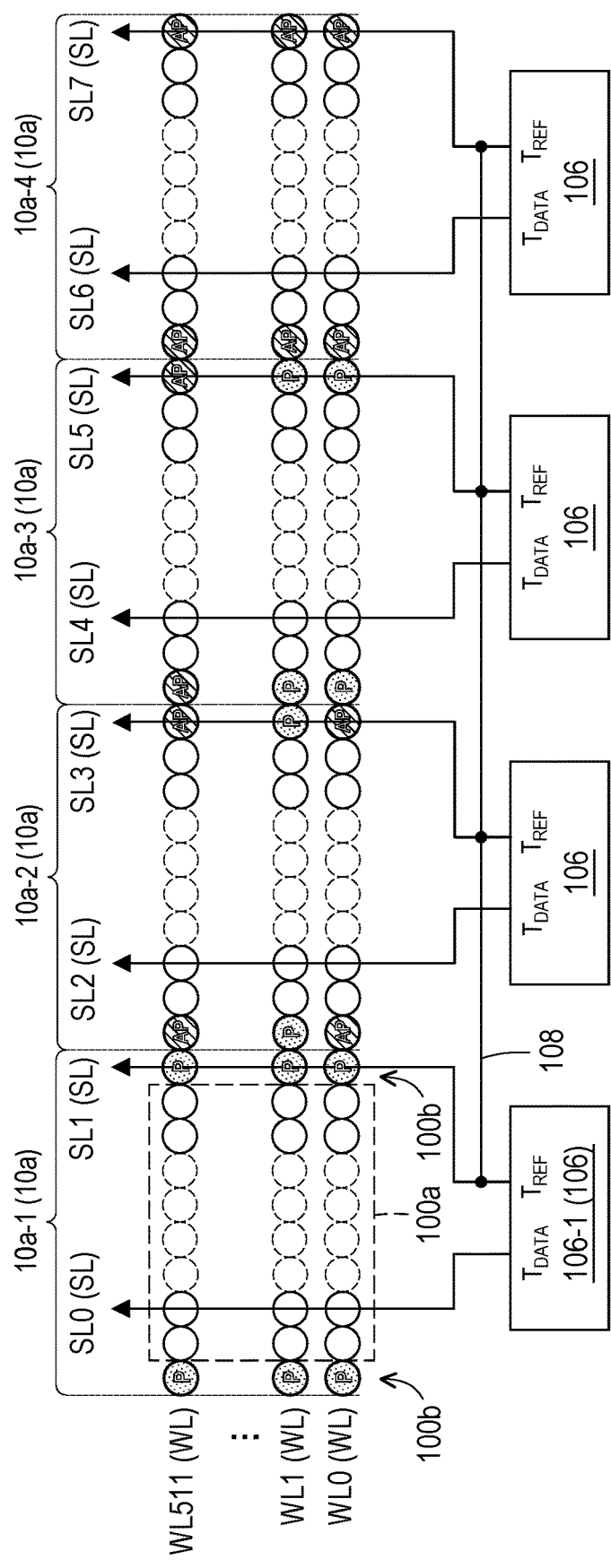
FIG. 5 illustrates a local reference current trimming scheme for some rows in the memory array, according to some embodiments of the present disclosure.

FIG. 5 illustrates a local reference current trimming scheme for some rows in the memory array 10, according to some embodiments of the present disclosure.

As an example, the reference cells 100b in the memory arrays 10a-1, 10a-3 are initially programmed with the low resistance state (corresponding to the parallel orientation P), while the reference cells 100b in the memory arrays 10a-2, 10a-4 are initially programmed with the high resistance state (corresponding to the anti-parallel orientation AP). During the local reference current trimming, the reference cells 100b in the sub-array 10a-2 and connected to the word line WL1 may be rewritten with the low resistance state (corresponding to the parallel orientation P). In addition, the reference cells 100b in the sub-array 10a-3 and connected to the word line WL511 may be rewritten with the high resistance state (corresponding to the anti-parallel orientation AP). As a result, a ratio of an amount of the reference cells 100b connected to the word line WL1 and programmed with the low resistance state over an amount of the reference cells 100b connected to the word line WL1 and programmed with the high resistance state may be increased. Accordingly, the reference current generated by the reference cells 100b connected to the word line WL1 may be slightly increased. In addition, a ratio of an amount of the reference cells 100b connected to the word line WL511 and programmed with the low resistance state over an amount of the reference cells 100b connected to the word line WL511 and programmed with the high resistance state may be decreased, and the reference current generated by the reference cells 100b connected to the word line WL511 may be slightly lowered. On the other hand, the reference cells 100b connected to the word line WL0 may remained holding the initially written pattern of the resistance states, thus the reference current generated by the reference cells 100b connected to the word line WL0 would not be altered.

It should be appreciated that the example shown in FIG. 5 is only provided for illustration purpose. There would be more of the sub-arrays 10a in the memory array 10, and the range of reference cell rewriting may not be limited to a certain one or a certain group of the sub-arrays 10a. Further, the local reference current trimming may cover the redundant row(s) connected along the repair word line(s) WLR as described with reference to FIG. 3, and the reference cells 100b in the redundant row(s) may be subjected to rewriting.

Referring to FIG. 2 again, at a following step S206, column repair is performed. During the column repair, defective one(s) among the data cells 100a is/are identified, and the data cells 100a in the defective one of the cell column(s) (i.e., the sub-array(s) 10a including the defective data cell(s) 100a) are replaced. In order to identify the defective one(s) among the data cells 100a, the read operations each described with reference to FIG. 1B are used for checking if the data cells 100a could correctly store both of the low resistance state (corresponding to the parallel orientation P) and the high resistance state (corresponding to the anti-parallel orientation AP). Specifically, all of the data cells 100a may be initially programmed with one of the low resistance state (corresponding to the parallel orientation P) and the high resistance state (corresponding to the anti-parallel orientation AP), and each of the data cells 100a is read by the corresponding sense amplifier 106, to identify one(s) in the data cells 100a that fail(s) to correctly store the low resistance state or the high resistance state. Thereafter, all of the data cells 100a may be rewritten with the other one of the low resistance state and the high resistance state, and each of the data cells 100a is once again read, to identify one(s) in the data cells 100a that fail(s) to correctly store the rewritten resistance state. The data cell(s) 100a fail(s) to correctly store the low resistance state or the high resistance state will be identified as the defective data cell(s) 100a. Thereafter, all of the data cells 100a in the sub-array(s) 10a containing the defective data cell(s) 100a are replaced by data cells in the redundant sub-array(s), as will be further described.

Figure 6:
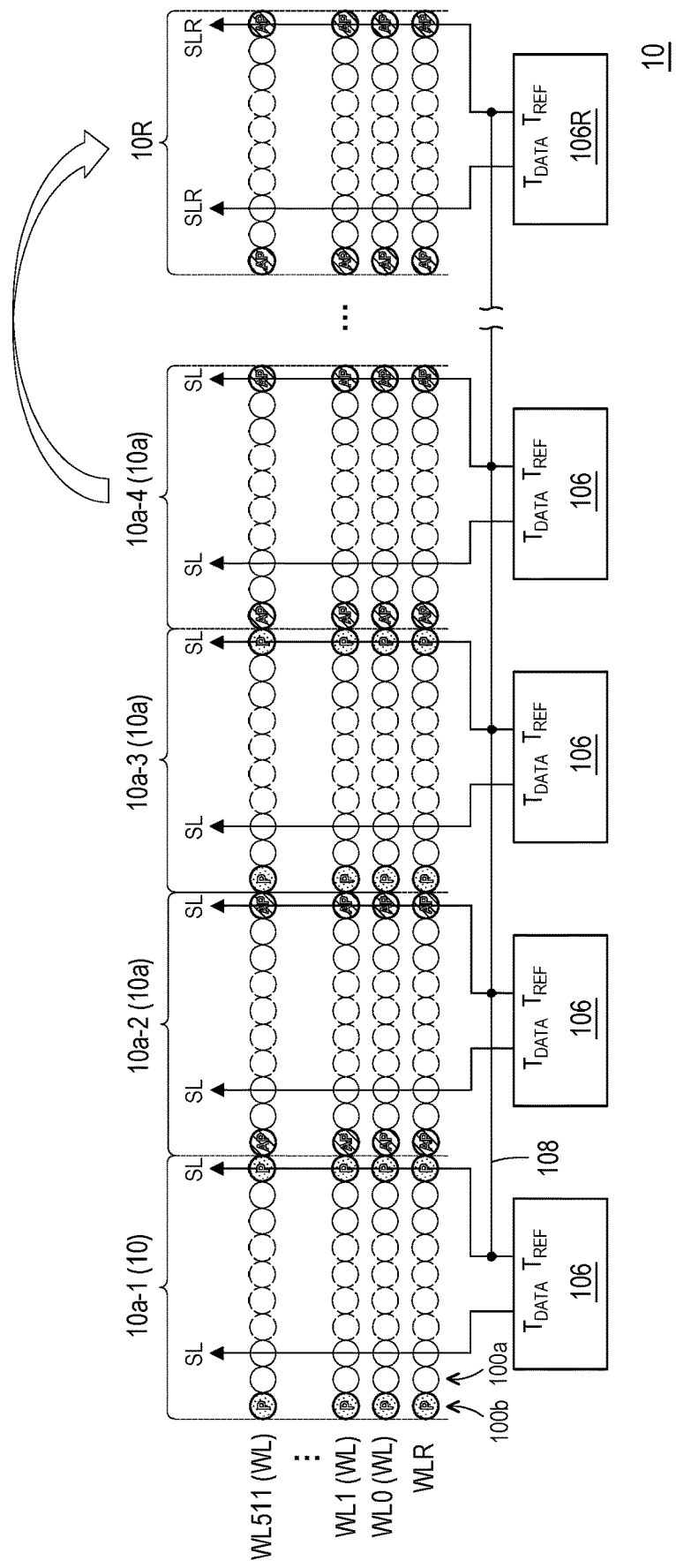
FIG. 6 illustrates a column repair scheme for the memory array, according to some embodiments of the present disclosure.

FIG. 6 illustrates a column repair scheme for the memory array 10, according to some embodiments of the present disclosure.

Although not shown in other figures, the memory array 10 includes at least one redundant sub-array 10R for replacing the data cells 100a in the defective sub-array(s) 10a (containing the defective data cell(s) 100a). As identical to each of the sub-arrays 10a, the redundant sub-array 10R includes columns of data cells 100a and columns of reference cells 100b (e.g., two columns of reference cells 100b at opposite sides of the columns of the data cells 100a). The word lines WL further extend to the redundant sub-array 10R, and respectively connect a row of the data cells 100a and the reference cells 100b in the redundant sub-array 10R. Although not shown, additional bit lines and additional reference bit lines are further included in the memory array 10. The additional bit lines each connect a column of the data cells 100a in the redundant sub-array 10R, whereas the additional reference bit lines each connect a column of the reference cells 100b in the redundant sub-array 10R. Further, the data cells 100a and the reference cells 100b in the redundant sub-array 10R are connected to an additional sense amplifier 106R through additional source lines SLR. As similar to the data cells 100a and the reference cells 100b in any of the sub-arrays 10a, the data cells 100a and the reference cells 100b in the redundant sub-array 10R are connected to the additional sense amplifier 106R by groups. That is, one of the additional source lines SLR is configured to connect a group of the data cells 100a and the reference cells 100b in the redundant sub-array 10R to the additional sense amplifier 106R, and the other additional source line SLR is configured to connect another group of the data cells 100a and the reference cells 100b in the redundant sub-array 10R to the additional sense amplifier 106R. Moreover, in some embodiments, the reference input terminal $T_{REF}$ of the additional sense amplifier 106R is connected to the reference input terminals $T_{REF}$ of other sense amplifiers 106 via, for example, the interconnection line 108. In these embodiments, one of the reference cells 100b in the redundant sub-array 10R may participate in generating the reference current for each read operation, and the reference cells 100b in the redundant sub-array 10R may be pre-programmed with the low resistance state (corresponding to the parallel orientation P) or the high resistance state (corresponding to the anti-parallel orientation AP). On the other hand, the data input terminal $T_{DATA}$ of the additional sense amplifier 106R may not be connected with the data input terminals $T_{DATA}$ of other sense amplifiers 106.

It should be appreciated that, the memory array 10 may include multiple redundant sub-arrays 10R, in case more than one sub-arrays 10a are found with defective data cells 100a. Those skilled in the art may adjust an amount of the redundant sub-array(s) according to manufacturing yield of the memory array 10, the present disclosure is not limited thereto.

As an example of the column repair shown in FIG. 6, when one or more defective data cell(s) 100a is/are found in the sub-array 10a-4, all of the data cells 100a may be replaced by the data cells 100a in the redundant sub-array 10R. Upon replacement, when one of the data cells 100a in the sub-array 10a-4 is selected, a corresponding one of the data cells 100a in the redundant sub-array 10R is instead accessed. That is, instructions for accessing the data cells 100*a* in the sub-array 10*a*-4 will be redirected to the data cells 100*a* in the redundant sub-array 10R.

According to some embodiments, bit line addresses of the data cells 100*a* in the defective sub-array(s) 10*a* (the sub-array(s) 10*a* including the defective data cell(s) 100*a*) and the corresponding bit line addresses of the corresponding data cells 100*a* in the redundant sub-array(s) 10R are stored in a column redundancy look up table (CRLUP). As an example, the CRLUT may be implemented by a latch-based memory circuit, such as a SRAM circuit. When a bit line address is provided for accessing one or more of the data cells 100*a* connected along the designated bit line BL, a logic circuit (not shown) may be used to check if the received bit line address matches any of the bit line address(es) of the defective data cell(s) 100*a* stored in the CRLUT. If not, the logic circuit may pass through the received bit line address, and an operation voltage may be provided to the bit line BL corresponding to the received bit line address. If the received bit line address matches an address of a defective data cell 100*a* stored in the CRLUT, then the logic circuit outputs the bit line address of the corresponding data cell 100*a* in the redundant sub-array 10R, and the operation voltage is instead provided to the additional bit line corresponding to the bit line address for substitution. That is, the data cells 100*a* in the defective sub-array(s) 10*a* (the sub-array(s) 10*a* including at least one defective data cell 100*a*) are re-addressed to the corresponding data cells 100*a* in the redundant sub-array 10R.

In some embodiments, the redundant row(s) connected along the repair word line(s) WLR further extend to the redundant sub-array(s) 10R. In these embodiments, the additional bit lines and the additional reference bit lines (both not shown) further extend through the data cells 100*a* and the reference cells 100*b* in the redundant sub-array(s) 10R and connected along the repair word line(s) WLR. In addition, the additional source lines SLR connect these data cells 100*a* and reference cells 100*b* to the additional sense amplifier(s) 106R. As the redundant row(s) further extend(s) to the redundant sub-array(s) 10R, the data cells 100*a* in the defective sub-array(s) 10*a* and arranged along the redundant row(s) may also be re-addressed to the data cells 100*a* in the redundant sub-array(s) 10R and arranged along the redundant row(s).

Up to here, the defective ones among the data cells 100*a* and the reference cells 100*b* have been identified and repaired (i.e., replaced by redundant cells). In addition, the read margin for each of the sub-arrays 10*a* and for each row in the sub-arrays 10*a* has been optimized. Therefore, accuracy of the read operations for the memory array 10 can be effectively improved.

According to the described flow, the reference cells 100*b* are tested and repaired during the step of the row repair (i.e., the step S200), which precedes the step of trimming the sense amplifiers 106 (i.e., the step S202), the step of reference current trimming (i.e., the step S204) and the step of column repair (i.e., the step S206). Therefore, it can be ensured that they are the verified reference cells 100*b* being operated for obtaining the data current distributions and the reference current distribution during the sense amplifier trimming, being rewritten during the local reference current trimming, and being operated for testing the data cells 100*a* during the column repair. In addition, an entire sub-array 10*a* is subjected to read margin optimization when each sense amplifier 106 is trimmed, while only the reference cells 100*b* in a single row are subjected to read margin optimization in each time of the local reference current trimming. Therefore, the read margin optimization during the sense amplifier trimming is a coarse tuning on the read margin, whereas the read margin optimization during the local reference current trimming is a fine tuning on the read margin, and is performed after the coarse tuning. Moreover, as the column repair is performed after the sense amplifier trimming for read margin coarse tuning and the local reference current trimming for read margin fine tuning, identifying the defective data cells 100*a* during the column repair can be performed with higher accuracy.

Alternatively, the steps S200, S202, S204, S206 can be performed according to another sequential order.

Figure 7:
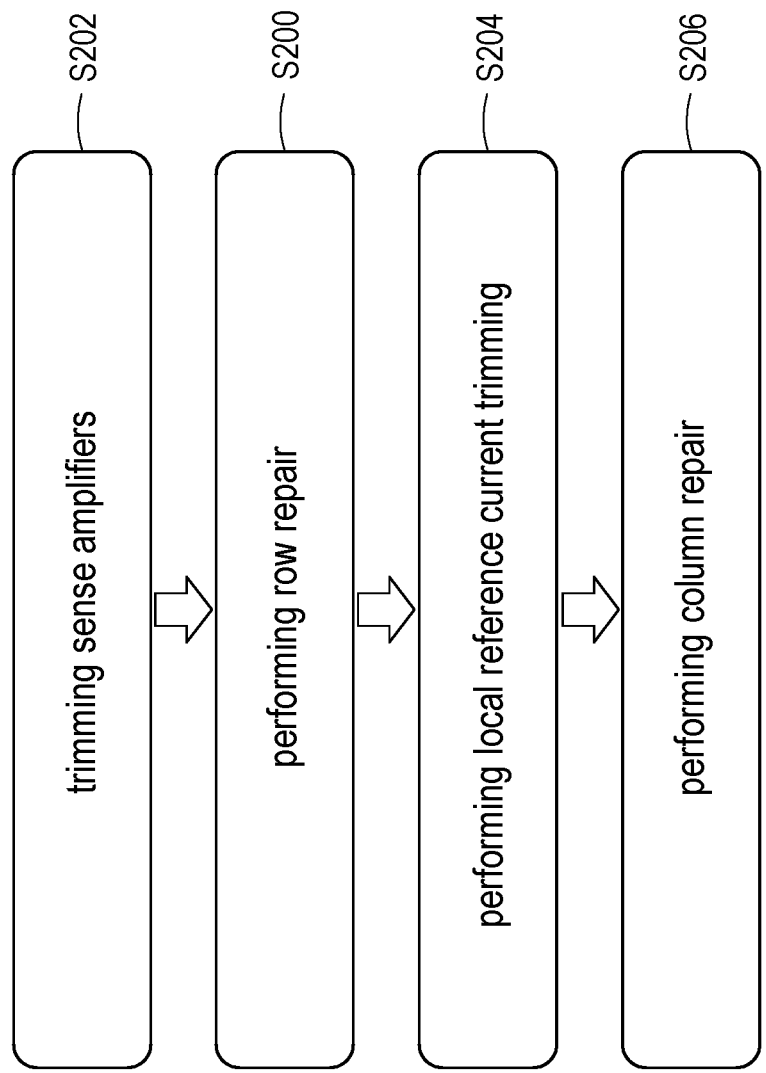
FIG. 7 is a flow diagram illustrating a process for testing and repairing the memory array, according to some other embodiments of the present disclosure.

FIG. 7 is a flow diagram illustrating a process for testing and repairing the memory array 10, according to some other embodiments of the present disclosure.

Referring to FIG. 7, in some other embodiments, the step S202 of the sense amplifier trimming precedes the step S200 of the row repair, while the step S204 of the local reference current trimming and the step S206 of the column repair follow the step S200 of the row repair in order. In these embodiments, along with other benefits, reading the reference cells 100*b* during the row repair can be performed with optimized read margin resulted from the sense amplifier trimming.

As above, a memory device and a read operation for the memory device are provided. The memory device includes a memory array having multiple sub-arrays, each including columns of data cells and columns of reference cells. The data cells and the reference cells respectively include an access transistor and a magnetic storage device coupled to the access transistor. Source lines connect different groups of the data cells and the reference cells in each sub-array to a corresponding sense amplifier. During the read operation, a selected data cell in one of the sub-arrays is connected to a data input terminal of the corresponding sense amplifier by a first source line, and a reference cell in this sub-array and arranged along the same cell row as the selected data cell is connected to a reference input terminal of the sense amplifier by a second source line, such that interference between the data cell and the reference cell can be avoided. Further, other reference cells from other sub-arrays and arranged along the same cell row as the selected data cell are also connected to the reference input terminal of the sense amplifier. These reference cells are partly programmed with a low resistance state and partly programmed with a high resistance state, and are connected in parallel between the reference input terminal of the sense amplifier and a common terminal, to provide a reference current to the reference input terminal of the sense amplifier. By using the sense amplifier to compare a data current from the selected data cell and the reference current provided by the reference cells connected in parallel, the resistance state of the selected data cell can be identified, and data stored in the selected data cell can be read out. Since the reference current is collectively provided by the reference cells connected in parallel rather than a single reference cell, variation of the reference current resulted from individual reference cells can be minimized.

Further, a method for testing and repairing the memory device is provided. In addition to sense amplifier trimming for coarsely tuning read margin and column repair for replacing defective data cells, the method further includes row repair and local reference current trimming. During the row repair, defective one(s) among the reference cells is/are identified, and a cell row including at least one defective reference cell is entirely re-addressed to a redundant cell row. As a result of the row repair, it can be ensured that they are verified reference cells being operated for the rest testing and repairing processes as well as normal reading operations. In addition, during the local reference current trimming, the reference current for each cell row is fine tuned. Specifically, an approach to adjust the reference current for each cell row includes modifying a ratio of an amount of the reference cells programmed with the low resistance state over an amount of the reference cells programmed with the high resistance state for each cell row. As a result of the local reference current trimming, row-to-row difference in read margin may be reduced or even eliminated. Therefore, as including the row repair and the local reference current trimming, the method for testing and repairing the memory device may further prevent reading inaccuracy caused by the reference current.

In an aspect of the present disclosure, a method for testing and repairing a memory device is provided. The memory device comprises a memory array comprising data cells and reference cells arranged along cell rows and cell columns. The data cells are configured to store data, and the reference cells are configured to generate a reference current for reading the data stored in the data cells. The method comprises: performing a row repair, to test the reference cells in each cell row, and to replace the cell row containing at least one defective reference cell by a redundant cell row comprising additional data cells and additional reference cells; and performing a local reference current trimming, to modify a ratio of an amount of the reference cells programmed with a low resistance state over an amount of the reference cells programmed with a high resistance state for at least one of the cell rows.

In another aspect of the present disclosure, a method for testing and repairing a memory device is provided. The memory device comprises a memory array comprising data cells and reference cells arranged along cell rows and cell columns. Sub-arrays of the memory array are connected to sense amplifiers, respectively. The method comprises: performing a row repair, to test the reference cells in each cell row, and to replace the cell row containing at least one defective reference cell by a redundant cell row comprising additional data cells and additional reference cells; performing a sense amplifier trimming, to tune at least one of the sense amplifiers, so as to adjust read margins of all of the data cells in at least one of the sub-arrays corresponding to the at least one of the sense amplifiers; and performing a local reference current trimming, to modify a ratio of an amount of the reference cells programmed with a low resistance state over an amount of the reference cells programmed with a high resistance state for at least one of the cell rows.

In yet another aspect of the present disclosure, a method for testing and repairing a memory device is provided. The memory device comprises a memory array comprising data cells and reference cells arranged along cell rows and cell columns. Sub-arrays of the memory array respectively comprise columns of the data cells and at least two columns of the reference cells. The method comprises: performing a row repair, to test the reference cells in each cell row, and to replace the cell row containing at least one defective reference cell by a redundant cell row comprising additional data cells and additional reference cells; performing a local reference current trimming, to modify a ratio of an amount of the reference cells programmed with a low resistance state over an amount of the reference cells programmed with a high resistance state for at least one of the cell rows; and performing a column repair, to test the data cells in each sub-array, and to replace all of the data cells in the sub-array containing at least one defective data cell 5 by additional data cells in a redundant sub-array.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for testing and repairing a memory device, wherein the memory device comprises a memory array comprising data cells and reference cells arranged along cell rows and cell columns, the data cells are configured to store data, the reference cells are configured to generate a reference current for reading the data stored in the data cells, and the method comprises:

performing a row repair, to test whether a first reference cell is defective using a plurality of second reference cells, and to replace the cell row containing the first reference cell by a redundant cell row comprising additional data cells and additional reference cells when the first reference cell is determined as defective; and performing a local reference current trimming, to modify a ratio of an amount of the reference cells programmed with a low resistance state over an amount of the reference cells programmed with a high resistance state for at least one of the cell rows.

2. The method according to claim 1, wherein sense amplifiers are configured to read the data stored in the data cells, sub-arrays of the memory array are respectively connected to one of the sense amplifiers, a first group of the data cells and a first group of the reference cells in each sub-array are connected to a corresponding one of the sense amplifiers via a first source line, and a second group of the data cells and a second group of the reference cells in each sub-array are connected to the corresponding one of the sense amplifiers via a second source line.

3. The method according to claim 2, wherein each of the sense amplifiers has a reference input terminal configured to receive a reference current generated by a group of the reference cells from different ones of the sub-arrays and connected in parallel between the reference input terminal and a common terminal, a portion of the reference cells in the group are programmed with the low resistance state, and another portion of the reference cells in the group are programmed with the high resistance state.

4. The method according to claim 3, wherein the reference input terminals of the sense amplifiers are connected with one another.

5. The method according to claim 2, wherein testing one of the reference cells in one of the sub-arrays during the row repair comprises:

coupling the one of the reference cells to a data input terminal of one of the sense amplifiers;

coupling a group of the reference cells comprising another one of the reference cells in the one of the sub-arrays and multiple ones of the reference cells from others of the sub-arrays, to a reference input terminal of the one of the sense amplifiers, wherein the reference cells in the group are connected in parallel between the reference input terminal and a common terminal, a portion of the reference cells in the group are programmed with the low resistance state, and another portion of the reference cells in the group are programmed with the high resistance state; and operating the one of the sense amplifiers to compare a current from the one of the reference cells with a current collectively generated by the group of the reference cells.

6. The method according to claim 1, wherein the row repair comprises:

storing a word line address of the cell row containing the first reference cell and a word line address of the redundant cell row in a row redundancy look up table (RRLUT).

7. The method according to claim 1, wherein replacing the cell row containing the first reference cell by the redundant cell row comprises re-addressing the cell row containing the first reference cell to the redundant cell row.

8. The method according to claim 1, wherein the row repair precedes the local reference current trimming.

9. The method according to claim 1, wherein modifying the ratio for the at least one of the cell rows comprise:

rewriting a portion of the reference cells in each of the at least one of the cell rows.

10. The method according to claim 1, wherein the local reference current trimming comprises modifying the ratio for the at least one of the cell rows according to optimum values generated for the cell rows by a built-in self-test (BIST) circuitry coupled to the memory array.

11. A method for testing and repairing a memory device, wherein the memory device comprises a memory array comprising data cells and reference cells arranged along cell rows and cell columns, sub-arrays of the memory array are connected to sense amplifiers respectively, and the data cells and the reference cells arranged in the same cell row are coupled to a same word line, the method comprises:

performing a row repair, to test the reference cells in each cell row, and to replace the cell row containing at least one defective reference cell by a redundant cell row comprising additional data cells and additional reference cells;

performing a sense amplifier trimming, to tune at least one of the sense amplifiers, so as to adjust read margins of all of the data cells in at least one of the sub-arrays corresponding to the at least one of the sense amplifiers;

performing a local reference current trimming, to modify a ratio of an amount of the reference cells programmed with a low resistance state over an amount of the reference cells programmed with a high resistance state for at least one of the cell rows.

12. The method according to claim 11, wherein each of the sense amplifiers has a data input terminal connected to a first node coupled to an input of a latch-based circuit and a reference input terminal connected to a second node coupled to another input of the latch-based circuit, the data input terminal is configured to receive a data current from a selected one of the data cells during a read operation, the reference input terminal is configured to receive a reference current generated by a group of the reference cells from different ones of the sub-arrays during the read operation, and tunning the at least one of the sense amplifiers comprises adjusting a resistance between the first node and the data input terminal of the at least one of the sense amplifiers.

13. The method according to claim 12, wherein each of the sense amplifiers comprises a data current trimming device comprising transistors switchably connected in parallel between the data input terminal and the first node, and tuning the at least one of the sense amplifiers comprises adjusting an amount of the transistors connected in parallel in the data current trimming device in the at least one of the sense amplifiers.

14. The method according to claim 12, wherein tunning the at least one of the sense amplifiers further comprises adjusting a resistance between the second node and the reference input terminal of the at least one of the sense amplifiers.

15. The method according to claim 14, each of the sense amplifiers comprises a reference current trimming device comprising transistors switchably connected in parallel between the reference input terminal and the second node, and tuning the at least one of the sense amplifiers further comprises adjusting an amount of the transistors connected in parallel in the reference current trimming device in the at least one of the sense amplifiers.

16. The method according to claim 11, wherein the row repair, the sense amplifier trimming and the local reference current trimming are preformed in order.

17. The method according to claim 11, wherein the sense amplifier trimming is followed by the row repair, and the row repair precedes the local reference current trimming.

18. A method for testing and repairing a memory device, wherein the memory device comprises a memory array comprising data cells and reference cells arranged along cell rows and cell columns, sub-arrays of the memory array respectively comprise columns of the data cells and at least two columns of the reference cells, and the method comprises:

performing a row repair, to test the reference cells in each cell row, and to replace the cell row containing at least one defective reference cell by a redundant cell row comprising additional data cells and additional reference cells;

performing a local reference current trimming, to modify a ratio of an amount of the reference cells programmed with a low resistance state over an amount of the reference cells programmed with a high resistance state for at least one of the cell rows; and performing a column repair, to test the data cells in each sub-array, and to replace all of the data cells in the sub-array containing at least one defective data cell by additional data cells in a redundant sub-array.

19. The method according to claim 18, wherein the redundant sub-array further comprises at least two columns of additional reference cells.

20. The method according to claim 18, wherein testing the data cells in each sub-array comprises:

programming the data cells in each sub-array with one of the low resistance state and the high resistance state;

reading the data cells in each sub-array;

rewriting the data cells in each sub-array with the other one of the low resistance state and the high resistance state; and reading the data cells in each sub-array again.

* * * * *